Patented Aug. 28, 1945

2,383,897

UNITED STATES PATENT OFFICE 2,383,897

α-NAPHTHYLMETHYL ESTERS OF HY-DROXY-ALIPHATIC ACIDS

Jack T. Thurston, Cos Cob, Conn., and John M. Grim, New York, N. Y., assignors to American Cyanamid Company, New York, N. Y., a corporation of Maine No Drawing. Application December 22, 1941, Serial No. 424,058

4 Claims. (Cl. 260—484)

This invention relates to α-naphthylmethyl esters of α-hydroxy aliphatic acids, and to cellulose derivatives plasticized therewith.

We have discovered that the α-naphthylmethyl esters of α-hydroxy aliphatic acids such as α-hydroxyisobutyric, lactic, malic, tartaric, and citric acids may be prepared by esterifying α-naphthylcarbinol with the desired hydroxy acid or by causing an α-naphthylmethyl halide and a salt of the desired hydroxy acid to react.

The new esters of the present invention have very low vapor pressures and are not attacked by water. Moreover, we have found that they make excellent plasticizers for most cellulose derivatives. It is well known that cellulosic compositions such as cellulose esters and ethers, which are commonly used in the preparation of lacquers, molding compositions, photographic films, and the like are characterized by the fact that in the dry state they are excessively hard and brittle and upon subjection to relatively slight flexure or extension they check and break. For purposes of overcoming this defect it has been customary to incorporate in cellulosic lacquers or varnishes a substantial portion of a plasticizing agent. These plasticizers impart elasticity and ductility to the dried lacquer or varnish film obtained on evaporation of the volatile solvent. In this manner, cracking or peeling of the film may be avoided and its adhesive qualities improved. Incorporation of substantial portions of plasticizers into cellulosic molding compositions bring about a more rapid and even flow of the materials and molding operations may be conducted at much lower temperatures than when no plasticizer is present.

The plasticizing esters of the present invention are for the most part compatible with and therefore may be compounded, either alone or together with other softening agents as camphor, dibutyl phthalate, etc., with inorganic acid esters of cellulose such as cellulose nitrate; with single organic esters of cellulose such as cellulose acetate, cellulose propionate, cellulose butyrate and cellulose stearate; with mixed organic acid esters of cellulose such as cellulose acetate-stearate, cellulose acetate-propionate, cellulose acetate-butyrate, cellulose acetate-lactate, and cellulose acetate tartrate; with mixed inorganic and organic acid esters of cellulose such as cellulose nitroacetate; and with cellulose ethers such as ethyl cellulose and benzyl cellulose.

The invention will be described in greater detail in conjunction with the following specific examples in which the proportions are given in parts by weight. It should be understood that these examples are merely illustrative and are not intended to limit the scope of the invention.

EXAMPLE 1

*α-Naphthylmethyl α-hydroxyisobutyrate*

58.8 parts 1-(chloromethyl)naphthalene, 16.6 parts α-hydroxyisobutyric acid and 47.3 parts potassium α-hydroxyisobutyric acid were heated for about 1 hour at 150°–160° C. in a round-bottomed flask fitted with a stirrer. The temperature was then raised to 170–180° C. and the heating was continued for three hours more. The whole mass was treated with 200 cc. of water, neutralized with sodium hydroxide and then extracted with carbon tetrachloride and dried. After the carbon tetrachloride had been distilled the dark oily liquid remaining was dissolved in naphtha and decolorized with activated charcoal. On cooling a yellow oily layer separated, which crystallized when cooled in an ice-salt bath. The solid was distilled at 128°–133° C. at about 1 mm. pressure, yielding 53 grams or 65% of the theoretical yield of a viscous and light straw-colored product which crystallized on standing overnight. After recrystallization from heptane the α-naphthylmethyl α-hydroxyisobutyrate melted at 50–52° C. and had a saponification number of 226.8.

EXAMPLE 2

*α-Naphthylmethyl malate*

134 parts (1.0 mol) malic acid, 395 parts (2.5 mols) α-naphthylcarbinol, 1600 parts xylene and 2.5 parts sodium hydroxide were refluxed for 5 hours in a 3-necked flask fitted with a stirrer and water trap. During this time 37.5 cc. of water were distilled. The slightly cloudy solution was filtered, washed several times with sodium bicarbonate solution, washed with water, dried with anhydrous sodium sulfate, and then decolorized with charcoal. The solvent was removed by reduced pressure distillation and in order to remove the last traces of solvent, the ester was heated at 150° C./20 mm. for 30 minutes after the solvent had been evaporated.

The α-naphthylmethyl malate obtained was a light yellow viscous syrup with an acid number of 10.0.

EXAMPLE 3

α-Naphthylmethyl lactate 104 parts (1.5 mols) 85% lactic acid, 158 parts (1.0 mol) α-naphthylcarbinol, and 650 parts xylene were refluxed in a 3-necked flask fitted with a stirrer and a water trap for 6 hours, during which time 52.5 cc. of water were removed. The xylene solution was washed several times with dilute sodium bicarbonate solution, washed with water, dried with sodium sulfate and finally decolorized with charcoal. After filtering, the solvent was removed by evaporation at reduced pressure and the temperature of the ester was raised to 150° C. in order to remove the last traces of solvent.

The α-naphthylmethyl lactate obtained was a light brown viscous syrup with an acid number of 1.0.

EXAMPLE 4

α-Naphthylmethyl tartrate 150 parts (1.0 mol) tartaric acid and 395 parts (2.5 mols) α-naphthylcarbinol were heated in a 3-necked flask provided with a stirrer for 1 hour at 170° C. At the end of this time water of esterification was no longer being evolved. The reaction mixture was then dissolved in ether, neutralized with dilute sodium bicarbonate solution, washed with water, dried with sodium sulfate and decolorized with charcoal. After the ether was evaporated, the α-naphthylmethyl tartrate crystallized. The crystalline ester was found to have a melting point of 95°–100° C. and an acid number of 1.0.

EXAMPLE 5

α-Naphthylmethyl citrate 210 parts (1.0 mol) citric acid containing 1 mol water of crystallization, 632 parts (4.0 mols) α-naphthylcarbinol and 2500 parts of kerosene boiling at 200° C. contained in a 3-necked flask fitted with a stirrer and water trap were refluxed until 72 cc. of water were distilled. The kerosene was then removed at reduced pressure and the residue dissolved in ether and purified as described in the preceding examples.

The brown resinous α-naphthylmethyl citrate obtained had an acid number of 3.0.

The esters prepared as described in the above examples were tested for their plasticizing effects on cellulose derivatives.

EXAMPLE 6

25% and 50% concentrations of α-naphthylmethyl α-hydroxyisobutyrate were mixed with a 20% solution of nitrocellulose in a solvent comprising by volume 4 parts toluene, 3 parts ethyl acetate, 2 parts butyl acetate and 1 part butyl alcohol and the mixtures poured onto a glass plate to dry. The resulting films were found to be well plasticized and they possessed considerable strength.

EXAMPLE 7

A. Compatibility

Mixtures containing varying proportions of α-naphthylmethyl α-hydroxyisobutyrate and solutions of cellulose derivatives were poured onto glass and the films examined immediately after drying. As will be evident from the following table, the isobutyrate was found to be compatible with each of the cellulose derivatives investigated. The symbol "∞" denotes complete miscibility of α-naphthylmethyl α-hyroxyisobutyrate with the cellulose derivative in question.

| Cellulose derivative | Isobutyrate-cellulose derivative | | |
|---|---|---|---|
| | 1:9 | 5:5 | 9:1 |
| Nitrocellulose—20% solution is lacquer solvent, comprising, by volume, 4 parts toluene, 3 parts ethyl acetate, 2 parts butyl acetate and 1 part butyl alcohol | ∞ | ∞ | ∞ |
| Ethyl cellulose—20% solution in 80:20 toluene:ethyl alcohol, by weight | ∞ | ∞ | ∞ |
| Cellulose acetate—20% solution in 90:10 acetone:ethyl alcohol, by weight | ∞ | ∞ | ∞ |
| Cellulose nitroacetate—15% solution in acetone | ∞ | ∞ | ∞ |
| Cellulose acetobutyrate—15% solution in methyl ethyl ketone | ∞ | ∞ | ∞ |
| Cellulose acetopropionate—20% solution in methyl ethyl ketone | ∞ | ∞ | ∞ |
| Benzylcellulose—20% solution in ethyl acetate | ∞ | ∞ | ∞ |

B. Tensile strength

Tensile strengths of mixtures of α-naphthylmethyl α-hydroxyisobutyrate and nitrocellulose in the proportions of 1:9 and 5:5 were compared with those of mixtures of camphor and nitrocellulose in the same proportions with the following results:

| | Film width | Film thickness | Tensile strength | Elongation |
|---|---|---|---|---|
| | Inches | Inches | Lbs./in. | Per cent |
| α-Naphthylmethyl α-hydroxyisobutyrate and nitrocellulose-1:9 | 0.5 | 0.001 | 11,000 | 4 |
| Camphor and nitrocellulose-1:9 | 0.5 | 0.001 | 11,200 | 5 |
| α-Naphthylmethyl α-hydroxyisobutyrate and nitrocellulose-5:5 | 0.5 | 0.0015 | 3,730 | 20 |
| Camphor and nitrocellulose-5:5 | 0.5 | 0.0015 | 5,740 | 3 |

It will be apparent from the above data that α-naphthylmethyl α-hydroxyisobutyrate and camphor are very similar in their plasticizing effects in films containing the 1:9 mixtures. The 5:5 α-naphthylmethyl α-hydroxyisobutyrate-nitrocellulose films show slight decrease in tensile strength but with a corresponding large increase in elongation, whereas the 5:5 camphor-nitrocellulose films did not lose as much tensile strength, yet they showed no increase at all in elongation. The 5:5 α-naphthylmethyl α-hydroxyisobutyrate film felt much more limp than the 5:5 camphor film which was comparatively rigid.

EXAMPLE 8

10% solutions of cellulose acetate, cellulose nitrate, benzyl cellulose and ethyl cellulose were prepared. α-Naphthylmethyl esters of lactic, malic, and tartaric, acids were then dissolved in equal weights of acetone and various combinations of the two types of solutions were prepared by thorough mixing. The mixtures were flowed out on glass and allowed to air dry overnight after which the film was removed from the glass. The following data were obtained:

*Plasticizing action of hydroxy esters of α-naphthylcarbinol*

| Cellulose derivatives | Solvents, parts | Lactic | α-Naphthylmethyl esters of— | |
|---|---|---|---|---|
| | | | Malic | Tartaric |
| Acetate | 80 acetone, 20 ethyl acet | 33% [1]: good plasticizer | | |
| Nitrate | 80 acetone, 20 ethanol | | | |
| Benzyl | 50 toluene | 33%: tacky, 15%: very good plasticizer. | 33%: tacky, 15%: very good plasticizer. | |
| Ethyl | 80 toluene, 20 ethanol | 33%: too soft; 15%: very good plasticizer. | | 33%: well plasticized. |

[1] Concentration of ester in the dried film.

It will be seen from the above that the α-naphthylmethyl esters vary among themselves in their plasticizing efficiencies and moreover, the effect of each ester varies from one cellulose derivative to another. α-Naphthylmethyl esters of α-hydroxy aliphatic monobasic acids appear to be the most effective plasticizers and they constitute the preferred embodiment of the present invention which is not, however, intended to be limited thereto.

Plastic compositions containing the plasticizers of the present invention find use, as indicated above, in the preparation of lacquers, varnishes, molding compositions, photographic film, artificial silk, coating composition, laminated articles, etc.

What we claim is:

1. The α-naphthylmethyl ester of a α-hydroxy aliphatic carboxylic acid.
2. The α-naphthylmethyl ester of a α-hydroxy aliphatic monobasic carboxylic acid.
3. The α-naphthylmethyl ester of α-hydroxyisobutyric acid.
4. The α-naphthylmethyl ester of lactic acid.

JACK T. THURSTON.
JOHN M. GRIM.